US012798397B2

(12) United States Patent
Heseding

(10) Patent No.: US 12,798,397 B2
(45) Date of Patent: Nov. 17, 2026

(54) METHOD FOR PLANNING AN OPERATING STRATEGY FOR AN ELECTRICALLY DRIVABLE VEHICLE, IN PARTICULAR A UTILITY VEHICLE, COMPUTER PROGRAM AND/OR COMPUTER-READABLE MEDIUM, CONTROLLER, ELECTRICALLY DRIVABLE VEHICLE, IN PARTICULAR A UTILITY VEHICLE

(71) Applicant: ZF CV Systems Global GmbH, Bern (CH)

(72) Inventor: Johannes Heseding, Hannover (DE)

(73) Assignee: ZF CV Systems Global GmbH, Bern (CH)

( * ) Notice: Subject to any disclaimer, the term of this patent is extended or adjusted under 35 U.S.C. 154(b) by 25 days.

(21) Appl. No.: 19/096,190

(22) Filed: Mar. 31, 2025

(65) Prior Publication Data

US 2025/0229646 A1 Jul. 17, 2025

Related U.S. Application Data

(63) Continuation of application No. PCT/EP2023/074605, filed on Sep. 7, 2023.

(30) Foreign Application Priority Data

Sep. 30, 2022 (DE) ..................... 10 2022 125 389.9

(51) Int. Cl.

*B60L 58/13* (2019.01)
*B60L 7/10* (2006.01)
*B60L 15/20* (2006.01)

(52) U.S. Cl.

CPC ............. *B60L 15/2045* (2013.01); *B60L 7/10* (2013.01); *B60L 58/13* (2019.02); *B60L 2200/36* (2013.01); *B60L 2260/54* (2013.01)

(58) Field of Classification Search

CPC ........ B60L 15/2045; B60L 7/10; B60L 58/13; B60L 2200/36; B60L 2260/54; B60L 2240/622; B60L 3/0046; B60L 53/62
See application file for complete search history.

(56) References Cited

U.S. PATENT DOCUMENTS 8,768,553 B2 * 7/2014 Cho ........................ B60L 50/62
180/65.21
9,205,839 B2 * 12/2015 Lennevi .................... B60L 7/16
(Continued)

FOREIGN PATENT DOCUMENTS

DE 10 2013 002 240 B3 7/2014
DE 10 2017 211 548 A1 8/2018
(Continued)

OTHER PUBLICATIONS

Wagner Philipp et al., Dec. 11, 2020 English Machine Translation_ DE102020133118 A1 provided by Patent Translate by EPO and Google (Year: 2020).*
(Continued)

*Primary Examiner* — Ashley L Redhead, Jr.
(74) *Attorney, Agent, or Firm* — Walter Ottesen, P.A.

(57) ABSTRACT

A method for planning an operating strategy for a vehicle having an energy storage device and an electric drive capable of regenerative braking. The storage device can be charged during regenerative braking and at a charging station. The method includes: determining a position along a route along which the vehicle can travel and which has a charging station; identifying a first permitted state of charge for charging the storage device at the charging station for driving along the route and a second permitted state of charge for charging the storage device at the charging station in order to travel along a worst-case route that can be traveled from the first charging station; identifying a limitation of the first permitted state of charge when traveling
(Continued)

along the route, the limitation being based on the second permitted state of charge; and planning the operating strategy taking the limitation into account.

16 Claims, 3 Drawing Sheets

(56) References Cited

U.S. PATENT DOCUMENTS

| | | | | |
|---|---|---|---|---|
| 10,005,446 | B2 * | 6/2018 | Jeong | B60W 20/13 |
| 10,377,261 | B2 * | 8/2019 | Smidebrant | B60L 3/0046 |
| 11,820,375 | B2 * | 11/2023 | Petisme | B60W 50/0097 |
| 11,951,840 | B2 * | 4/2024 | Boaretto | B60L 15/20 |
| 12,103,401 | B2 * | 10/2024 | Kvist | B60L 7/00 |
| 12,311,913 | B2 * | 5/2025 | Mathews, Jr. | B60W 20/12 |
| 2008/0133076 | A1 * | 6/2008 | Formanski | H01M 8/04619 307/64 |
| 2011/0291470 | A1 * | 12/2011 | Drumm | B60T 7/042 303/3 |
| 2015/0073637 | A1 * | 3/2015 | Lennevi | B60W 50/0097 701/22 |
| 2017/0341527 | A1 * | 11/2017 | Smidebrant | B60L 50/51 |
| 2020/0161874 | A1 | 5/2020 | Ito | |
| 2020/0182642 | A1 | 6/2020 | Ellison et al. | |
| 2023/0322203 | A1 * | 10/2023 | Telford | B60L 50/75 701/22 |
| 2023/0392543 | A1 * | 12/2023 | Colavincenzo | B60L 1/003 |
| 2024/0025265 | A1 | 1/2024 | Wagner et al. | |
| 2024/0025294 | A1 * | 1/2024 | Treharne | B60L 3/0046 |
| 2025/0018829 | A1 | 1/2025 | Heseding et al. | |
| 2025/0229646 | A1 * | 7/2025 | Heseding | B60L 3/0046 |

FOREIGN PATENT DOCUMENTS

| | | | | |
|---|---|---|---|---|
| DE | 10 2020 104 293 | A1 | 8/2021 | |
| DE | 102020133118 | A1 * | 6/2022 | B60L 58/13 |
| DE | 10 2022 108 592 | A1 | 10/2023 | |
| EP | 3 647 087 | A1 | 5/2020 | |

OTHER PUBLICATIONS

English translation and Written Opinion of the International Searching Authority dated Dec. 14, 2023 for international application PCT/EP2023/074605 on which this application is based.

International Search Report of the European Patent Office dated Dec. 14, 2023 for international application PCT/EP2023/074605 on which this application is based.

* cited by examiner

METHOD FOR PLANNING AN OPERATING STRATEGY FOR AN ELECTRICALLY DRIVABLE VEHICLE, IN PARTICULAR A UTILITY VEHICLE, COMPUTER PROGRAM AND/OR COMPUTER-READABLE MEDIUM, CONTROLLER, ELECTRICALLY DRIVABLE VEHICLE, IN PARTICULAR A UTILITY VEHICLE

CROSS-REFERENCE TO RELATED APPLICATIONS

This application is a continuation application of international patent application PCT/EP2023/074605, filed Sep. 7, 2023, designating the United States and claiming priority from German application 10 2022 125 389.9, filed Sep. 30, 2022, and the entire content of both applications is incorporated herein by reference.

TECHNICAL FIELD

The disclosure relates to a method for planning an operating strategy for an electrically drivable vehicle, in particular a utility vehicle, having an energy storage device and an electric drive capable of regenerative braking, wherein the energy storage device can be charged during regenerative braking and can be charged at a charging station external to the vehicle. The disclosure further relates to a computer program and/or computer-readable medium, a controller for an electrically drivable vehicle, in particular a utility vehicle, having an energy storage device and an electric drive capable of regenerative braking, wherein the energy storage device can be charged during regenerative braking and can be charged at a vehicle-external charging station, and an electrically drivable vehicle, in particular utility vehicle, having an energy storage device and an electric drive capable of regenerative braking and having a controller.

The disclosure relates in particular to electrically drivable vehicles (battery electric vehicles, BEV), in particular utility vehicles, which must satisfy a Type II-A test according to 'Regulation No. 13 of the Economic Commission for Europe of the United Nations (UNECE)—Uniform requirements for type approval of vehicles of categories M, N, and O with regard to brakes [2016/194]' (ECE R 13). This requires a vehicle to maintain a speed of 30 km/h over a 6 km downhill slope with a 7% gradient without using the friction brakes.

BACKGROUND

The Type II-A test can be passed by BEVs if a state of charge of a battery storage device of the BEVs allows the energy recovered by recuperation (regenerative braking) to be absorbed. Failure to do so cannot guarantee compliance with the Type II-A test. The energy storage device must be able to be recharged by regenerative braking of an electric drive, in particular without the risk of overcharging and thus damaging the energy storage device. Therefore, separate measures must be implemented for BEVs. One option involves implementing an intelligent energy management function that can work predictively and, if necessary, keep the state of charge within a suitable range. For this purpose, it may be necessary for the energy storage device to be charged at a charging station external to the vehicle only up to a determinable target state of charge, wherein the target state of charge is below a charging capacity of the energy storage device.

The fundamental problem for this so-called predictive solution lies in the fact that the expected energy balance, that is, the energy consumed by driving, taking into account the energy recovery by recuperation, in the vehicle cannot be effectively predicted due to the computing power of a data processing device in the vehicle and the availability of data. Even a route entered into a navigation system, for example, and the predictive calculation of energy consumption when driving along the route is not effective on its own, since the process of following the route can be interrupted by the driver at any time. Furthermore, a predictive method may not take into account the fact that the vehicle mass, which determines the potential energy of the vehicle, can change at any time during the journey, that is, along a route, when the vehicle is loaded and/or unloaded.

Therefore, the method used in the prior art to determine a target state of charge to which the energy storage device is to be charged at a charging point, is to consider a so-called worst-case scenario. The worst-case scenario assumes the position of the charging station, that is, a position of the vehicle determined by the charging station. Starting from the position, all possible or potentially navigable routes are determined and a permitted state of charge based on the respective route is determined along each of the routes, wherein the permitted state of charge is obtained taking into account regenerative braking during a downhill descent along the respective route. The worst-case scenario is the scenario in which the most and/or cumulative energy can be recovered by regenerative braking. The permitted state of charge can be determined in such a way that the permitted state of charge in the worst-case scenario does not exceed the charging capacity of the energy storage device during the journey.

DE 10 2020 133 118 A1 discloses such a predictive method for providing a storage capacity reserve in a traction battery for an electrically driven motor vehicle, preferably a utility vehicle, for a forthcoming descent. The method includes detecting whether an electrical charging process of the traction battery via an external charging source is imminent, and determining one or more possible downhill slopes for a forthcoming descent after the electrical charging process. The method further includes predicting or estimating one or more amounts of recuperated energy recuperated by the motor vehicle along each of the specified downhill slopes, and setting, for example lowering, a maximum battery state of charge of the traction battery for the charging process using the external charging source depending on the predicted amount or the predicted amounts of recuperated energy. The highest amount of recuperated energy can be selected from the predicted amounts and the maximum battery state of charge can be set in accordance with the highest amount. The maximum battery state of charge may be obtained from a storage capacity or a target value for the maximum battery state of charge of the traction battery minus the selected maximum quantity. This guarantees continuous recuperative braking during the forthcoming downhill descent along each of the determined downhill slopes without overloading the traction battery and avoiding the use of braking resistances. Thus, the specified maximum battery state of charge may be the lowest of the possible maximum battery states of charge of the possible downhill slopes. This means that the maximum battery charge state is selected that provides the greatest storage capacity reserve of the traction battery, in order to avoid overcharging the traction battery, regardless of which of the possible slopes the driver ultimately chooses to drive along.

The German patent application DE 10 2022 108 592.9, which was not yet published at the filing date of the present patent application, describes a method for an electrically drivable vehicle, in particular a utility vehicle, having an energy storage device and an electric drive capable of regenerative braking, wherein the energy storage device can be charged during regenerative braking and the energy storage device is rechargeable and can be charged at a charging station external to the vehicle, the method including the steps of: determining a charging status, the charging status including the information as to whether the energy storage device is charged by the charging station external to the vehicle; capturing vehicle information relating to the vehicle, in particular the utility vehicle, and position information relating to the position of the vehicle, in particular the utility vehicle, depending on the charging status; transferring the vehicle information and the position information to a server external to the vehicle; and receiving a target state of charge from the server external to the vehicle.

In addition, DE 10 2022 108 592.9 describes allowing a planned route to be incorporated into the worst-case analysis of the possible routes either as a weighted value or an absolute value.

However, the use of the electric drive for the purpose of regenerative braking is used not only for the efficient operation of the vehicle, but also forms part of a safety system for the safe operation of the vehicle. However, the analysis of a planned route when determining a permitted state of charge might not be permissible, for example, due to legal regulations, since the operation of the vehicle must not have any influence over the functioning of a safety system.

In other words, predictive charging management to ensure the continuous performance of the electric drive by managing the maximum charge at a charging station based on worst-case routes and their predicted charging profiles should not take the actual route (or, more broadly, "operating strategy") of the vehicle into account in such a way that at the point of charging, that is, at the charging station, a route that would lead to the charge state being exceeded is excluded because it is not planned.

However, this may in particular result in a significant restriction of the permitted state of charge, although the worst-case route may not be traveled and/or is irrelevant in practice. The restriction may have an impact on the vehicle's operating strategy, vehicle range, route planning and/or satisfaction for the user and/or operator of the vehicle.

SUMMARY

It is an object of the disclosure to enable an improved determination of a target state of charge in order to achieve a more effective planning of the operating strategy.

The object is achieved by various embodiments of the disclosure.

According to an aspect of the disclosure, a method is provided for planning an operating strategy for an electrically drivable vehicle, in particular a utility vehicle, having an energy storage device and an electric drive capable of regenerative braking, wherein the energy storage device can be charged during regenerative braking and can be charged at a charging station external to the vehicle. The method includes the steps of: determining a position along a route, along which the vehicle, in particular the utility vehicle, can travel and which has a charging station; identifying a first permitted state of charge for charging the energy storage device at the charging station for driving along the route and a second permitted state of charge for charging the energy storage device at the charging station in order to travel along a worst-case route that can be traveled from the first charging station; identifying a limitation of the first permitted state of charge when traveling along the route, the limitation being based on the second permitted state of charge; and planning the operating strategy taking the limitation into account.

The electrically driven vehicle, in particular utility vehicle, is hereinafter referred to as the vehicle. The energy storage device and the electric drive are configured in such a way that the energy storage device provides an electrical current for the electric drive in order to drive the vehicle. The electric drive is configured to decelerate the vehicle via regenerative braking, wherein when the vehicle is decelerating, energy from the vehicle is converted into electrical energy. The electric drive and the energy storage device are configured to store the energy converted by the regenerative braking in the energy storage device.

The energy storage device can be charged by the charging station external to the vehicle. The vehicle-external charging station and the vehicle each have a corresponding interface to connect the vehicle or the energy storage device thereof to the vehicle-external charging station for charging the energy storage device. The vehicle-external charging station and the vehicle are configured to charge the energy storage device up to a permitted state of charge. The permitted state of charge can be specified, for example, by a proportion of a maximum charging capacity of the energy storage device. The difference between the maximum charge state and the target charge state is referred to as a buffer.

The position and the charging station are arranged along the route. The charging station can be accessed by the vehicle from the position. The first permitted state of charge characterizes the state of charge to which the vehicle could be charged at the charging station if the vehicle were charged to drive along the route without considering the worst-case route and without the state of charge exceeding the charge capacity during recuperation along the route. The second permitted state of charge characterizes the state of charge to which the vehicle is to be charged at the charging station, so as to ensure that the permitted state of charge does not exceed the charging capacity of the energy storage device in the worst-case scenario, that is, when driving along the worst-case route. The worst-case route is the route that leads to a maximum charge state caused by recuperation when starting from the charging station.

It has been recognized that the first permitted state of charge must be limited by the worst-case scenario, that is, the second permitted state of charge, in order to meet safety requirements. The limitation of the first state of charge by the second state of charge thus characterizes the need to reduce the first permitted state of charge at the charging station due to consideration of the worst-case scenario. This means that the limitation can be related to a specific charging station.

It has also been recognized that this limitation must be taken into account when planning the operating strategy in order to enable reliable and safe operation of the vehicle while minimizing the negative impact of the limitation on the operating strategy of the vehicle during planning of the operating strategy.

According to various embodiments, the method includes: determining a plurality of routes between the position and a common target point of the routes, with a charging station being arranged along more than one of the routes. In other words, the position defines a start and the target point defines a destination, wherein the start and destination are the same for the plurality of routes. By determining the plurality of routes, the operational strategy planning can include more than just one possible route, opening up a larger space of possibilities for planning the operational strategy. Since a charging station is arranged along more than one of the routes, the identification of the first permitted state of charge and the second permitted state of charge, the identification of the limitation and the planning of the operating strategy can be carried out for each of the routes taking the limitation into account. In addition, it is possible that a plurality of charging stations may be arranged along one or more of the routes.

According to various embodiments, a plurality of charging stations is arranged along the route and the limitation is identified for more than one of the charging stations. This allows an increased space of possibilities for planning the operational strategy. Since more than one charging stations are arranged along the route, the identification of the first permitted state of charge and the second permitted state of charge, the identification of the limitation and the planning of the operating strategy can be carried out for each of the routes taking the limitation into account.

According to various embodiments, the position is determined in such a way that the position is a position of the vehicle, in particular utility vehicle. This makes it possible for the planning of the operating strategy to be carried out on-line, that is, while the vehicle is driving, wherein the current position of the vehicle can be considered. Alternatively or in addition, the position is a position of the charging station. This means that planning of the operating strategy can be carried out in a predictive manner, as potential limitations can be identified before the utility vehicle reaches the charging station.

According to various embodiments, the limitation includes a difference between the first permitted state of charge and the second permitted state of charge. This allows the limitation to be efficiently quantified. Based on the difference, the limitation can be graphically displayed and/or effectively processed further for planning.

According to various embodiments, the method includes: arranging the output of the limitation to a user and/or driver of the vehicle, in particular the utility vehicle, and/or to a fleet management system. In particular, by outputting information to the user and/or driver, information can be provided on-line. In particular, the output to the fleet management system allows the limitation to be fully taken into account when planning the operation of a fleet of vehicles.

According to various embodiments, the planning of the operating strategy includes route planning, planning the charging of the energy storage device at the charging station and/or planning a payload. It has been recognized that the limitation can have an influence on the planning of a route, the charging and/or the payload, that is, the loading and unloading of the vehicle. For example, routes can be avoided and/or weighted lower in the route planning if a comparatively large limitation would have to occur, while a route without any and/or with a comparatively small limitation can be preferred.

The planning of the operating strategy advantageously takes a total range, a driving time and/or charging costs into account. It was recognized that the limitation can have an influence on the overall range, the driving time and/or the charging costs. For example, it may be advantageous for summing the charging costs to first accept comparatively large limitations with comparatively high charging costs at a first charging station in order to be able to obtain a comparatively small limitation at comparatively low charging costs at a second charging station following the route.

According to various embodiments, the method includes: identifying a proposal to charge the energy storage device at a second charging station. The second charging station may be arranged along the route and/or along an alternative route. It has been recognized that it can be more efficient to charge the energy storage device at the second charging station than at the originally intended charging station. The proposal can be based on a second limitation related to the second charging station, wherein the second limitation may be less than the limitation at the first charging station. Alternatively, the second limitation can also be equal to or greater than the limitation at the first charging station. This can take into account the fact that energy is consumed by driving between the first charging station and the second charging station and that a scenario is possible according to which more charging can take place at the second charging station than at the first charging station, although the second limitation at the second charging station may be even greater than the limitation at the first charging station. This can thus take into account the fact that the energy additionally consumed for driving along the section of a route between the first charging station and the second charging station must be replaced.

According to various embodiments, the planning of the operating strategy is carried out taking a threshold condition relating to the limitation and/or a range reduction, determined on the basis of the limitation, into account. It is recognized here that not every limitation and/or range reduction has a significant influence on the planning. For example, the limitation and/or range reduction may be disregarded in the planning if the limitation and/or range reduction is below a threshold value defining the threshold condition. Otherwise, if the limitation and/or range reduction is above the threshold, the limitation and/or range reduction will be taken into account when planning the operating strategy.

According to an aspect of the disclosure, a computer program and/or a computer-readable medium are provided. The computer program and/or the computer-readable medium include commands which, when the program or commands are executed by a computer, cause the computer to carry out the method according to the disclosure and/or steps thereof. Optionally, the computer program and/or the computer-readable medium includes commands which, when the program or commands are executed by a computer, cause the computer to carry out the method steps described as advantageous or optional, in order to achieve a related technical effect.

According to an aspect of the disclosure, a controller is provided for an electrically drivable vehicle, in particular a utility vehicle, having an energy storage device and an electric drive capable of regenerative braking, wherein the energy storage device can be charged during regenerative braking and the energy storage device can be charged at a charging station external to the vehicle. The controller is configured to carry out the method described above. Optionally, the controller is configured to carry out the method steps described as advantageous or optional in order to achieve a related technical effect.

According to an aspect of the disclosure, an electrically drivable vehicle, in particular a utility vehicle, is provided, having an energy storage device and an electric drive capable of regenerative braking and having the controller described above. In this case, the energy storage device can be charged during regenerative braking and the energy storage device can be charged at a charging station external to the vehicle. Optionally, the controller of the vehicle and/or the vehicle is configured to carry out the method steps described as advantageous or optional in order to achieve a related technical effect.

BRIEF DESCRIPTION OF DRAWINGS

The invention will now be described with reference to the drawings wherein.

DETAILED DESCRIPTION

Figure 1:
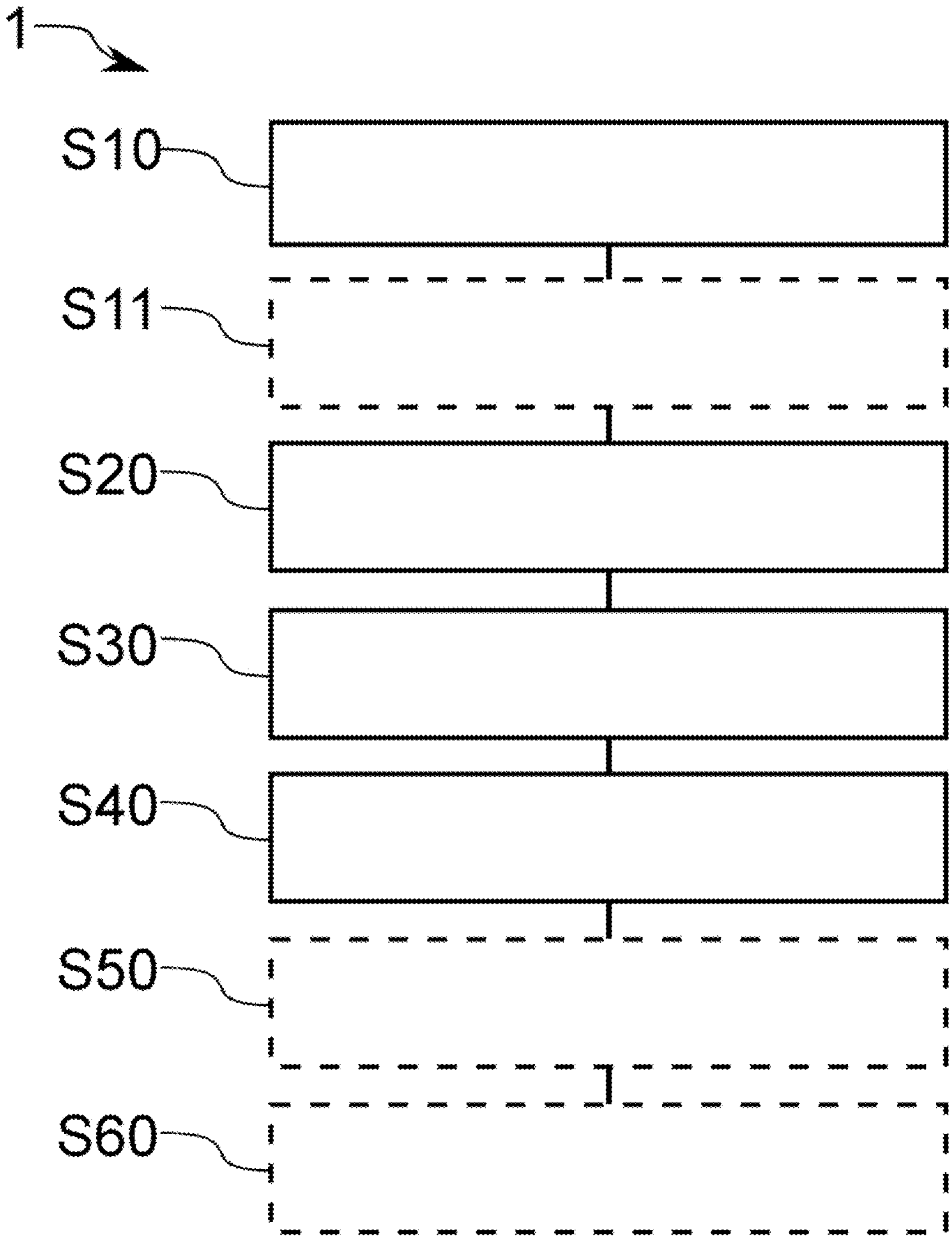
FIG. 1 shows a schematic illustration of a flow diagram of a method according to an embodiment of the disclosure.

FIG. 1 shows a schematic illustration of a flow diagram of a method 1 according to an embodiment of the disclosure. Optional steps of the method 1 are shown with a box with a dashed line.

The method 1 is a method 1 for planning an operating strategy for an electrically drivable vehicle 100*a,* in particular a utility vehicle 100*b,* having an energy storage device 20 and an electric drive 21 capable of regenerative braking NB, wherein the energy storage device 20 can be charged during regenerative braking NB and at a charging station 200 external to the vehicle. The vehicle 100*a,* in particular the utility vehicle 100*b,* is hereinafter referred to as the vehicle 100*a,* 100*b*. Such a vehicle 100*a*, 100*b* is described with reference to FIGS. 2 to 4.

The method 1 according to FIG. 1 includes: determining S10 a position 112 along a route 121 along which the vehicle 100*a,* 100*b* can drive and having a charging station 200. Depending on the route, it is possible that a plurality of charging stations 200 are arranged along the route 121.

The position 112 is determined in such a way that the position 112 is a position 112' of the vehicle 100*a,* 100*b* and/or the position 112 is a position 112" of the charging station 200. The position 112' of the vehicle 100*a,* 100*b* is the geoposition of the vehicle 100*a,* 100*b*. The position 112' of the vehicle 100*a,* 100*b* can be detected via a GPS system and/or determined via a wireless network. The position 112" of the charging station 200 can be determined, for example, via map material, wherein charging stations 200 are listed in the map material.

A plurality of routes 121 is determined S11 between the position 112 and a common target point 122 of the routes 121, wherein a charging station 200 is arranged along more than one of the routes 121. The target point 122 can be the target point 122 of an originally planned route 121 and/or be determined by an input. For example, the plurality of routes 121 are determined by a corridor around the original planned route 121. Alternatively, or in addition, it is possible to determine the plurality of routes 121 using a circle sector originating from the position 112 and/or a circle sector originating from the target point.

A next step involves identifying S20 a first permitted state of charge 114 for charging the energy storage device 20 at the charging station 200 for driving on the route 121 and a second permitted state of charge 115 for charging the energy storage device 20 at the charging station 200 in order to travel along a worst-case route 125 that can be traveled from the first charging station 200. In this case, the first permitted state of charge 114 is determined with regard to driving the route 121 as such starting from the charging station 200, that is, isolated from an analysis of another scenario, in particular a worst-case scenario (see also FIG. 4). When identifying the first permitted state of charge 114, the route 121 is examined with regard to energy to be consumed and recuperated when traveling along the route 121. The first permitted state of charge 114 is determined in such a way that a state of charge SoC of the energy storage device 20 during recuperation when driving the route 121 does not exceed the charging capacity 26 of the energy storage device 20. The second permitted state of charge 115 is identified by identifying all possible or potentially navigable routes starting from the charging station 200 and determining a permitted state of charge related to the respective route along each of the routes, wherein the permitted state of charge is obtained by taking one or more regenerative braking operations during a downhill descent along the respective route into account. The worst-case scenario in this case is the scenario in which the most and/or cumulative energy can be recovered by regenerative braking. The second permitted state of charge 115 is determined in such a way that the second permitted state of charge in the worst-case scenario does not exceed the charging capacity of the energy storage device.

A next step involves identifying S30 a limitation 116 of the first permitted state of charge 114 when traveling along the route 121, the limitation 116 being based on the second permitted state of charge 115. The limitation 116 includes a difference between the first permitted state of charge 114 and the second permitted state of charge 115. In this case, the step of identifying S30 the limitation 116 can be carried out for more than one of the charging stations 200, provided that a plurality of charging stations 200 are arranged along the route 121 and/or along the plurality of the routes 121.

The operating strategy is then planned S40, taking the limitation 116 into account.

The planning S40 of the operating strategy includes route planning, planning the charging of the energy storage device 20 at the charging station 200 and/or planning a payload. The route planning includes planning the route 121 or the path which is to be driven by the vehicle 100*a,* 100*b* to a target point 122. Planning of the charging of the energy storage device 20 includes planning how much energy is to be charged at which charging station 200. Payload planning includes the amount of load and/or goods to be loaded and/or unloaded at which location and/or when. The planning S40 of the operating strategy takes a total range, a driving time and/or charging costs into account.

The planning S40 of the operating strategy takes a threshold condition relating to the limitation 116 and/or a range reduction, determined on the basis of the limitation 116, into account. For example, the threshold condition may include a threshold value for the limitation 116 of 5% relative to the charging capacity 26 and/or for the range reduction of 20 km. Below the threshold value, the planning S40 of the operating strategy can be carried out as if no limitation 116 were to occur. Otherwise, that is, above the threshold value, the planning S40 of the operating strategy can be carried out taking explicit account of the limitation 116.

A next step involves arranging S50 the output of the limitation 116 to a user and/or driver of the vehicle 100*a,* in particular the utility vehicle 100*b,* and/or to a fleet management system 301.

A proposal 126 for charging the energy storage device 20 at a second charging station 201 is then identified S60. In this case, the second charging station 201 may be arranged along the route 121 and/or along an alternative route, which is included in the plurality of routes 121.

Figure 2:
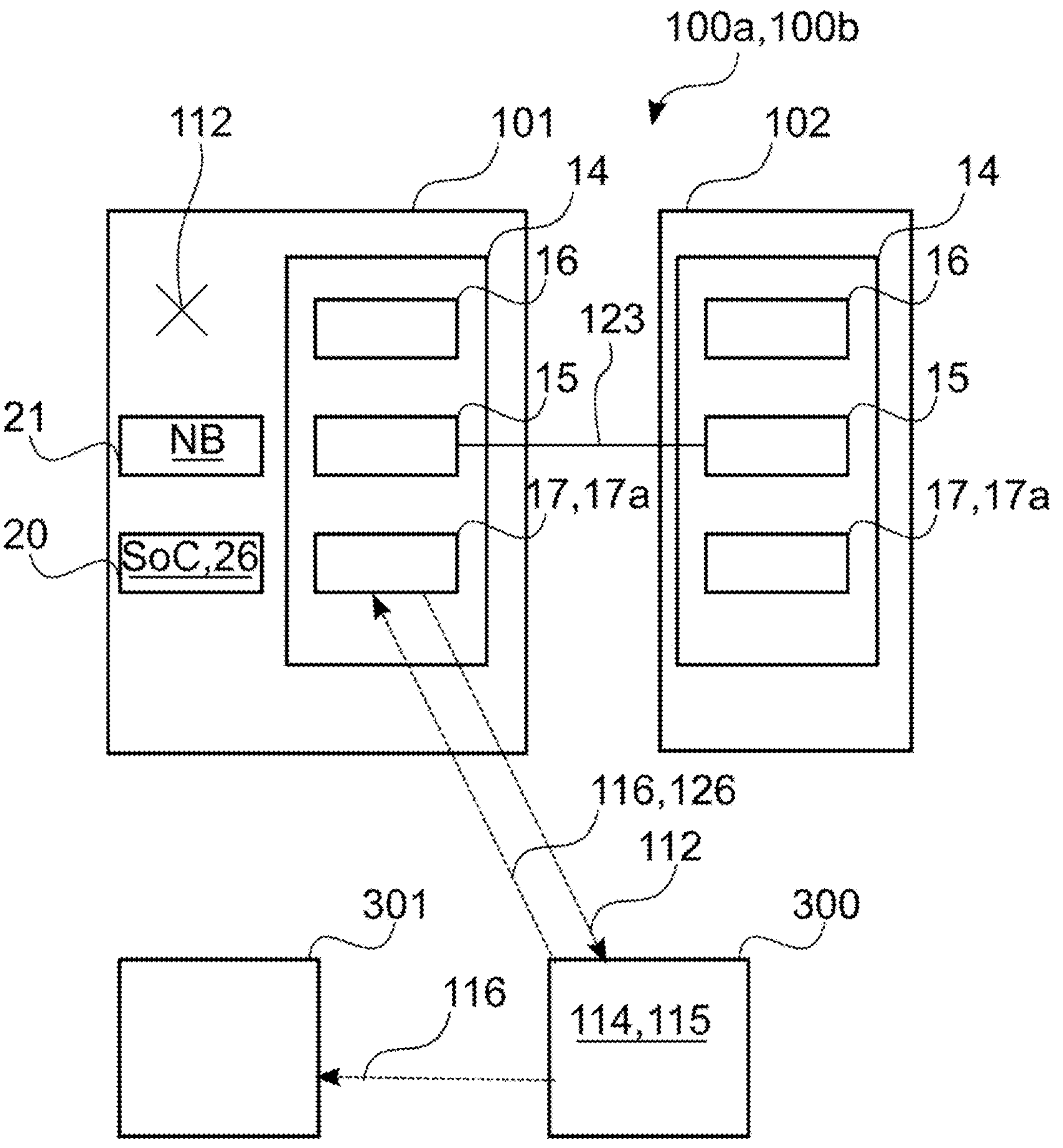
FIG. 2 shows a schematic illustration of an overview of a vehicle, in particular a utility vehicle, according to an embodiment of the disclosure.

FIG. 2 shows a schematic illustration of an overview of a vehicle 100*a,* in particular a utility vehicle 100*b,* according to an embodiment of the disclosure.

The vehicle 100*a,* 100*b* is preferably a land-based vehicle. The vehicle 100*a,* 100*b* is configured to carry out the method 1 described with reference to FIG. 1.

The vehicle 100*a,* 100*b* according to FIG. 2 includes a towing vehicle 101 and a trailer 102. The vehicle 100*a,* 100*b* or the towing vehicle 101 of the vehicle 100*a,* 100*b* includes an energy storage device 20 and an electric drive 21 capable of regenerative braking NB. The energy storage device 20 can be charged during regenerative braking NB and the energy storage device 20 can be charged at the charging station 200 external to the vehicle (see FIG. 4). The energy storage device 20 is an accumulator or a rechargeable battery. The energy storage device 20 has a state of charge SoC which indicates the amount of energy that can be converted into electrical energy by the energy storage device 20. The state of charge SoC is limited by the energy storage device 20, in particular by a charging capacity 26 of the energy storage device 20. The charging capacity 26 indicates the maximum possible state of charge SoC. The vehicle-external charging station 200 is configured to charge the energy storage device of the vehicle 100*a,* 100*b* according to a charge request.

In the embodiment shown in FIG. 2, the towing vehicle 101 and the trailer 102 each include a controller 14 having a vehicle interface 15, a data processing device 16 and a communication interface 17.

The vehicle interface 15 is configured to determine or record vehicle information with regard to the vehicle 100*a,* 100*b,* that is, according to the towing vehicle 101 or the trailer 102 respectively. With the vehicle interfaces 15, a communication link 123 internal to the vehicle can be established between the towing vehicle 101 and the trailer 102. More specifically, the communication link 123 is established between the vehicle interface 15 of the towing vehicle 101 and the vehicle interface 15 of the trailer 102. This allows vehicle information relating to the trailer 102 to be transmitted from the trailer 102 to the towing vehicle 101.

The data processing device 16 is configured to process and/or store data. For this purpose, the data processing device has a memory and a processor, not shown in each case. The data processing device 16 is configured to carry out one or more of the steps of the method 1 described with reference to FIG. 1.

The communication interfaces 17 are each mobile communication interfaces 17*a,* for example, interfaces for communication in a GSM (3G), LTE (4G) and/or 5G network. The communication interfaces 17 are each configured to communicate with a vehicle-external server 300 and/or a fleet management system 301. Thus, the vehicle 100*a,* 100*b* can transfer information or data to the vehicle-external server 300 and/or a fleet management system 301 and receive information or data from the vehicle-external server 300 and/or the fleet management system 301.

In the embodiment shown, the vehicle 100*a,* 100*b* is arranged at a position illustrated by a cross and the vehicle 100*a,* 100*b* transmits the position 112 to the server 300. The server 300 can carry out, for example, the determination S11 of the plurality of routes described with reference to FIG. 1, the identification S20 of the first permitted state of charge 114 and of the second permitted state of charge 115, the identification S30 of the limitation 116, the planning S40 of the operating strategy, the arranging S50 of the output and/or the identification S60 of the proposal 126. The server 300 transfers the limitation 116 for arranging S50 the output of the limitation 116 to the vehicle 100*a*, 100*b* and to the fleet management system 301. The server 300 transfers the proposal 126 to the vehicle 100*a,* 100*b.* This can be done by exploiting the fact that the server 300 or the cloud has greater computing power than the data processing device 16 of the vehicle 100*a,* 100*b* and/or more extensive data for carrying out the method steps than the vehicle 100*a,* 100*b* has.

In another embodiment (not shown), the server 300 includes the fleet management system 301 or vice versa. In this case it is not necessary to transmit the limitation 116 to the fleet management system 301.

In another embodiment (not shown), the controller 14 and/or the data processing device 16 is/are configured to carry out the determination S11 of the plurality of routes, the identification S20 of the first permitted state of charge 114 and of the second permitted state of charge 115, the identification S30 of the limitation 116, the planning S40 of the operating strategy, the arranging S50 of the output and/or the identification S60 of the proposal 126. The communication shown with the server 300 is then unnecessary.

Figure 3:
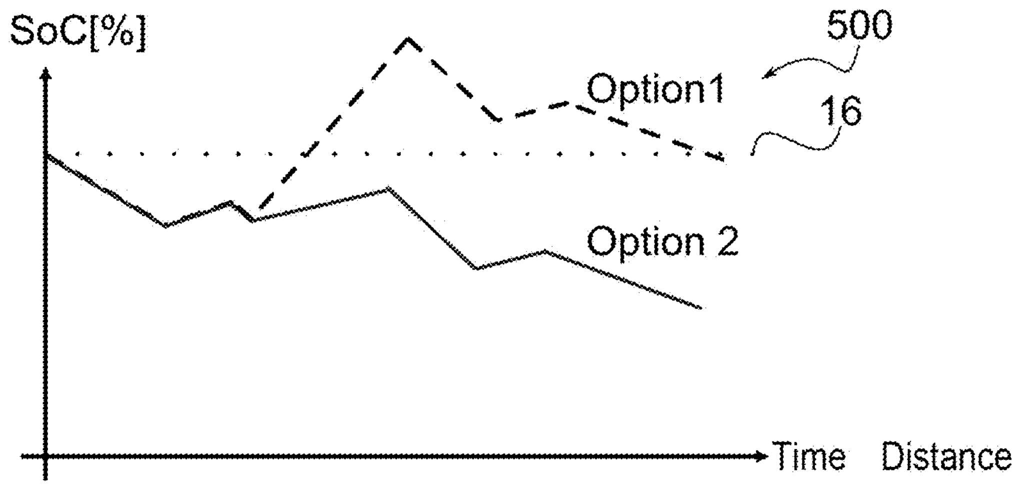
FIG. 3 shows a charge state curve of an energy storage device of a vehicle, in particular a utility vehicle; and, FIG. 4 shows a schematic illustration of a vehicle, in particular a utility vehicle, according to an embodiment of the disclosure in a scenario.

FIG. 3 shows a charge state curve 500 of an energy storage device 20 of a vehicle 100*a,* in particular a utility vehicle 100*b*. Such a vehicle 100*a,* 100*b* is described with reference to FIG. 2. The charge state curve 500 according to FIG. 3 shows the state of charge SoC of the energy storage device 20 as a function of the time or distance over which the vehicle 100*a,* 100*b* drives. During driving, the energy stored in the energy storage device 20 is converted by the electric drive 21 into kinetic energy of the vehicle 100*a,* 100*b.* This causes the state of charge SoC to decrease as a function of the time or the distance. Energy can be converted by the electric drive 21 via recuperation or regenerative braking NB and fed to the energy storage device 20. As a result, the state of charge SoC of the energy storage device 20 can rise. The charging capacity 26 of the energy storage device 20 is indicated by a horizontal dotted line.

The charge state curve 500 includes two options: Option1, Option2. The first option Option1 is shown with a dashed line and would result in the state of charge SoC exceeding the charging capacity 26 of the energy storage device 20. The second option Option2 is shown with a solid line and allows an efficient and safe operation of the vehicle 100*a,* 100*b.* The vehicle-external server 300 can be connected to a dispatcher via a fleet management system 301 and transfer the two options Option1 and Option2 to the dispatcher via the fleet management system 301. The dispatcher can select the second option Option2 via the fleet management system 301, wherein the vehicle-external server 300 then transfers a corresponding permitted state of charge 114, a corresponding route proposal and/or a loading proposal for adjusting the payload, to the vehicle 100*a,* 100*b.*

Figure 4:
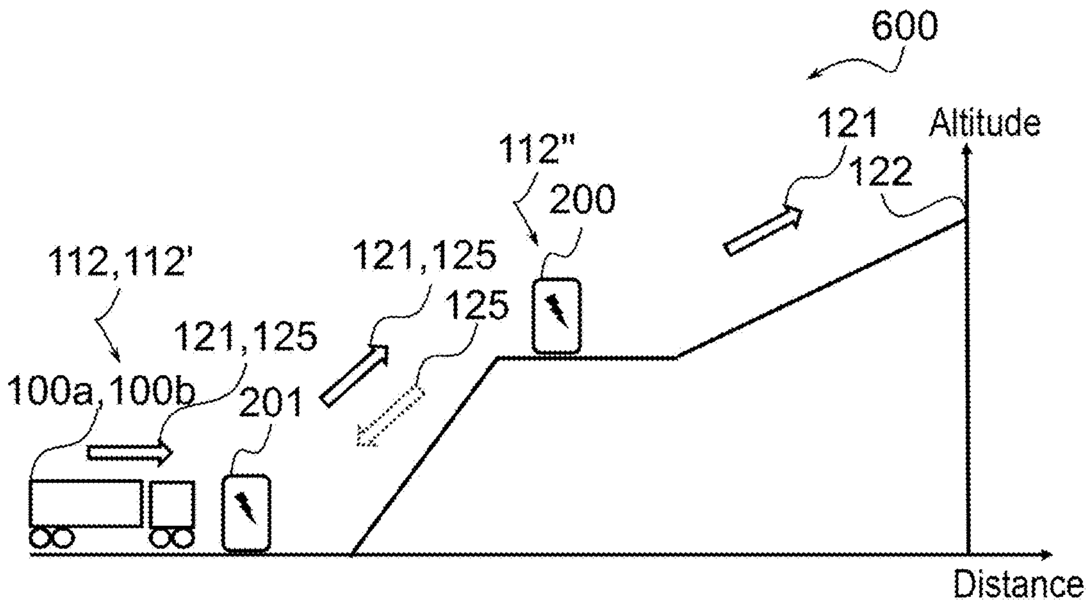

FIG. 4 shows a schematic illustration of a vehicle 100*a,* in particular a utility vehicle 100*b,* according to an embodiment of the disclosure in a scenario 600.

The scenario 600 shows the vehicle 100*a,* 100*b* described with reference to FIGS. 2 and 3, and a route profile defining the scenario 600, that is, a plot of altitude against distance. Scenario 600 thus illustrates a route 121 along an incline or a slope. Along the route 121 shown with arrows with a solid line in each case, the vehicle 100*a,* 100*b* is arranged at a position 112' of the vehicle 100*a,* 100*b.* The route 121 ends at a target point 122 of the route 121.

A charging station 200 and a second charging station 201 are arranged along the route 121. The charging station 200 is arranged at a position 112" of the charging station 200. Each of the vehicle-external charging stations 200, 201 can be, for example, a stationary or mobile charging station.

Scenario 600 illustrates a worst-case route 125. The worst-case route 125 corresponds to the route 121 at the position 112' of the vehicle 100*a*, 100*b* up to the position 112" of the charging station 200. However, since the target point 122 is located above the charging station 200 and the scenario 600 has a downhill slope starting from the position 112" of the charging station 200, the route 121 does not correspond to the worst-case route 125. The worst-case route 125 instead includes driving along the downhill slope, that is, in this case driving back to position 112' of the vehicle 100*a*, 100*b*, wherein the position 112' of the vehicle 100*a*, 100*b* is arranged below the charging station 200. In the worst-case scenario, that is, when driving along the worst-case route 125, the amount of recuperated energy is a maximum. However, the worst-case scenario is typically not traversed.

It is understood that the foregoing description is that of the preferred embodiments of the invention and that various changes and modifications may be made thereto without departing from the spirit and scope of the invention as defined in the appended claims.

Reference Signs (Part of the Description)

1 method for planning an operating strategy
14 controller
15 vehicle interface
16 data processing device
17 communication interface
17*a* mobile communication interface
20 energy storage device
21 electric drive
26 charging capacity
100*a* electrically drivable vehicle
100*b* electrically drivable utility vehicle
101 towing vehicle
102 trailer
110 charging status
111 vehicle information
112 position
112' position of a vehicle, in particular a utility vehicle
112" position of a charging station
114 first permitted state of charge
115 second permitted state of charge
116 limitation
121 route
122 target point
123 vehicle-internal communication link
125 worst-case route
126 proposal
200 charging station
201 second charging station
300 vehicle-external server
301 fleet management system
500 charge state curve
600 scenario
NB regenerative braking
SoC state of charge
S10 determining a position
S11 determining a plurality of routes
S20 identifying a first permitted state of charge and a second permitted state of charge
S30 identifying a limitation
S40 planning
S50 arranging an output
S60 identifying a proposal

The invention claimed is:

1. A method for planning an operating strategy for an electrically drivable vehicle having an energy storage device and an electric drive capable of regenerative braking, wherein the energy storage device is configured to be charged during regenerative braking and to be charged at charging stations external to the vehicle, the method comprising:

determining a position along a route which is travelable by the vehicle and which has a first charging station;

identifying a first permitted state of charge for charging the energy storage device at the first charging station for driving on the route and a second permitted state of charge for charging the energy storage device at the first charging station to travel along a worst-case route that is travelable from the first charging station, the worst-case route leading to a maximum state of charge caused by recuperation when starting from the first charging station, the first permitted state of charge characterizing the state of charge to which the vehicle could be charged at the first charging station if the vehicle were charged to drive along the route without considering the worst-case route and without the state of charge exceeding a charging capacity of the energy storage device during recuperation along the route;

identifying a limitation of the first permitted state of charge when traveling along the route, the limitation being based on the second permitted state of charge, wherein a plurality of charging stations is arranged along the route and said identifying the limitation is carried out for more than one of the plurality of charging stations; and, planning the operating strategy taking the limitation into account.

2. The method of claim 1 further comprising determining a plurality of routes between the position and a common target point of the plurality of routes, with more than one of the plurality of routes having at least one of the charging stations arranged therealong.

3. The method of claim 1, wherein the position is determined such that the position is at least one of a position of the vehicle and a position of the first charging station.

4. The method of claim 1, wherein the limitation includes a difference between the first permitted state of charge and the second permitted state of charge.

5. The method of claim 1 further comprising arranging the output of the limitation to at least one of a user of the vehicle, a driver of the vehicle, and a fleet management system.

6. The method of claim 1, wherein said planning the operating strategy includes at least one of route planning, planning the charging of the energy storage device at the first charging station, and planning a payload.

7. The method of claim 1, wherein said planning the operating strategy is carried out taking at least one of a total range, a driving time, and charging costs into account.

8. The method of claim 1 further comprising identifying a proposal for charging the energy storage device at a second charging station.

9. The method of claim 1, wherein said planning the operating strategy takes at least one of a threshold condition relating to the limitation and a range reduction, determined on the basis of the limitation, into account.

10. The method of claim 1, wherein the vehicle is a utility vehicle.

11. A computer program stored on a non-transitory computer-readable medium, the computer program comprising commands configured, when executed by a computer, to cause said computer to carry out the method of claim 1.

12. A non-transitory computer-readable medium comprising commands configured, when executed by a computer, to cause said computer to carry out the method of claim 1.

13. A controller for an electrically drivable vehicle having an energy storage device and an electric drive capable of regenerative braking, wherein the energy storage device is configured to be charged during regenerative braking and be charged at charging stations external to the vehicle, wherein the controller comprises:

a processor;

a non-transitory computer readable medium having program code stored thereon;

said program code being configured, when executed by said processor, to:

determine a position along a route travelable by the vehicle and which has a first charging station;

identify a first permitted state of charge for charging the energy storage device at the first charging station for driving on the route and a second permitted state of charge for charging the energy storage device at the first charging station in order to travel along a worst-case route that is travelable from the first charging station, the worst-case route leading to a maximum state of charge caused by recuperation when starting from the first charging station, the first permitted state of charge characterizing the state of charge to which the vehicle could be charged at the first charging station if the vehicle were charged to drive along the route without considering the worst-case route and without the state of charge exceeding a charging capacity of the energy storage device during recuperation along the route;

identify a limitation of the first permitted state of charge when traveling along the route, the limitation being based on the second permitted state of charge, wherein a plurality of charging stations is arranged along the route and said identification of the limitation is carried out for more than one of the plurality of charging stations; and, plan the operating strategy taking the limitation into account.

14. The controller of claim 13, wherein the vehicle is a utility vehicle.

15. An electrically drivable vehicle comprising:

an energy storage device;

an electric drive capable of regenerative braking;

a controller including a processor and a non-transitory computer readable medium having program code stored thereon;

said program code being configured, when executed by said processor, to:

determine a position along a route travelable by the vehicle and which has a first charging station;

identify a first permitted state of charge for charging the energy storage device at the first charging station for driving on the route and a second permitted state of charge for charging the energy storage device at the first charging station in order to travel along a worst-case route that is travelable from the first charging station, the worst-case route leading to a maximum state of charge caused by recuperation when starting from the first charging station, the first permitted state of charge characterizing the state of charge to which the vehicle could be charged at the first charging station if the vehicle were charged to drive along the route without considering the worst-case route and without the state of charge exceeding a charging capacity of the energy storage device during recuperation along the route;

identify a limitation of the first permitted state of charge when traveling along the route, the limitation being based on the second permitted state of charge, wherein a plurality of charging stations is arranged along the route and said identification of the limitation is carried out for more than one of the plurality of charging stations; and, plan the operating strategy taking the limitation into account;

said energy storage device being configured to be charged during regenerative braking and to be charged at charging stations external to the vehicle.

16. The electrically drivable vehicle of claim 15, wherein the vehicle is a utility vehicle.

* * * * *